(12) United States Patent
Dyck et al.

(10) Patent No.: US 8,240,145 B2
(45) Date of Patent: Aug. 14, 2012

(54) HYDROSTATIC ASSEMBLY HAVING COUPLED YOKES

(75) Inventors: Gerald Dyck, Abbotsford (CA); John Czepak, Burnaby (CA); Francesco Michele Caldarella, Lynden, WA (US); Dayao Alex Chen, Surrey (CA); Stig Ingemar Bratt, Trollhattan (SE)

(73) Assignee: Parker-Hannifin Corporation, Cleveland, OH (US)

( * ) Notice: Subject to any disclaimer, the term of this patent is extended or adjusted under 35 U.S.C. 154(b) by 843 days.

(21) Appl. No.: 12/391,433

(22) Filed: Feb. 24, 2009

(65) Prior Publication Data

US 2010/0212309 A1 Aug. 26, 2010

(51) Int. Cl.
*F16H 39/08* (2006.01)
*F16H 61/423* (2010.01)

(52) U.S. Cl. ............................................. 60/490; 92/56
(58) Field of Classification Search .............. 60/487, 60/490, 491; 92/56, 57, 58
See application file for complete search history.

(56) References Cited

U.S. PATENT DOCUMENTS

| 499,149 | A | 1/1991 | Bratt et al. | |
|---|---|---|---|---|
| 6,203,283 | B1 * | 3/2001 | Fleming et al. | 91/504 |
| 6,257,119 | B1 | 7/2001 | Ryken et al. | |
| 6,945,041 | B2 * | 9/2005 | Fleming et al. | 60/484 |
| 7,014,429 | B2 | 3/2006 | Gray, Jr. et al. | |
| 7,159,395 | B2 | 1/2007 | Fleming et al. | |
| 7,374,005 | B2 | 5/2008 | Gray, Jr. | |
| 2004/0262066 | A1 | 12/2004 | Fleming | |
| 2007/0277520 | A1 | 12/2007 | Gollner | |
| 2009/0020004 | A1 | 1/2009 | Gollner | |
| 2010/0116579 | A1 | 5/2010 | Wright et al. | |

FOREIGN PATENT DOCUMENTS

| DE | 1064311 B | 8/1959 |
|---|---|---|
| DE | 1069978 B | 11/1959 |
| DE | 23 35 629 A1 | 1/1975 |
| DE | 2335629 | 1/1975 |

OTHER PUBLICATIONS

Volvo Hydraulics, "Variable Pump/Motor V20", date unknown, Publication No. 45-8109 GB, Volvo Flygmotor AB, Trollhattan, Sweden.

* cited by examiner

*Primary Examiner* — Thomas E Lazo
(74) *Attorney, Agent, or Firm* — Daniel J. Whitman; Robert J. Clark

(57) ABSTRACT

A hydrostatic assembly includes a pump having a yoke and an associated rotating group. The pump yoke has a bucket portion and an arm portion. At least one fluid passage extends through the pump yoke. The hydrostatic assembly also includes a motor having a yoke and an associated rotating group. The motor yoke also has a bucket portion and an arm portion. At least one fluid passage extends through the motor yoke. The arm portion of the pump yoke and the arm portion of the motor yoke have associated coupling portions for fluidly coupling the pump yoke to the motor yoke so that the at least one fluid passage in the pump yoke is in direct fluid communication with the at least one fluid passage in the motor yoke.

24 Claims, 19 Drawing Sheets

HYDROSTATIC ASSEMBLY HAVING COUPLED YOKES

TECHNICAL FIELD

The present invention relates to a hydrostatic assembly. More particularly, this invention relates to a hydrostatic assembly having coupled yokes.

BACKGROUND

Hydrostatic assemblies or transmissions typically include a hydraulic pump and a hydraulic motor that are coupled together so that fluid from the pump is used to power the motor. Although hydraulic devices, such as pumps and motors, have high power density, the amount of power output from a hydrostatic assembly is limited by the physical size of the hydraulic devices. When additional power is required for a particular application, hydraulic devices of a larger physical size are commonly required. In many vehicles utilizing hydrostatic assemblies, space is limited. As a result, increasing the physical size of the hydraulic devices may not be possible with such vehicles.

FIG. 1 schematically illustrates a known hydrostatic assembly 10. The hydrostatic assembly 10 includes a variable displacement pump 14 and variable displacement motor 12. The pump 14 and motor 12 are in fluid communication with one another through hydraulic conduits 15 and 16, one of which is under high pressure during operation and one of which is under a lower pressure during operation. Commonly, in addition to conduits 15 and 16, the hydrostatic assembly 10 also includes other hardware, such as manifolds and fittings, for fluidly connecting the pump 14 and motor 12. The hardware adds further size and weight to the hydrostatic assembly 10.

Another known hydrostatic assembly 20 is illustrated in FIG. 2. The hydrostatic assembly 20 includes a bent axis pump 25 and a bent axis motor 26. Fluid transfer between the pump 25 and motor 26 is through fluid conduits routed through fixed manifolds 27A and 27B attached to each porting cap and manifold 27C, which is interposed between the fixed manifolds 27A and 27B.

A need exists for increasing the power output of a hydrostatic assembly without significantly increasing the physical size of the hydrostatic assembly. If the size of the fluid connections between the pump and motor is reduced, the overall size of the hydrostatic assembly may be maintained even when the size of the hydraulic devices in increased.

SUMMARY

According to one aspect of the invention, a hydrostatic assembly comprises a pump that includes a yoke and an associated rotating group for receiving hydraulic fluid and outputting hydraulic fluid under pressure. The pump yoke has a bucket portion and an arm portion. At least one fluid passage extends through the pump yoke for fluid communication with the pump rotating group. The hydrostatic assembly also comprises a motor that includes a yoke and an associated rotating group for receiving hydraulic fluid under pressure and outputting mechanical energy. The motor yoke has a bucket portion and an arm portion. At least one fluid passage extends through the motor yoke for fluid communication with the motor rotating group. The arm portion of the pump yoke and the arm portion of the motor yoke have associated coupling portions for placing the at least one fluid passage in the pump yoke in direct fluid communication with the at least one fluid passage in the motor yoke. The coupling portions being rotatable relative to one another to enable relative rotation between the pump yoke and motor yoke so that at least one of the pump and motor has a variable displacement.

DETAILED DESCRIPTION

Figure 9:
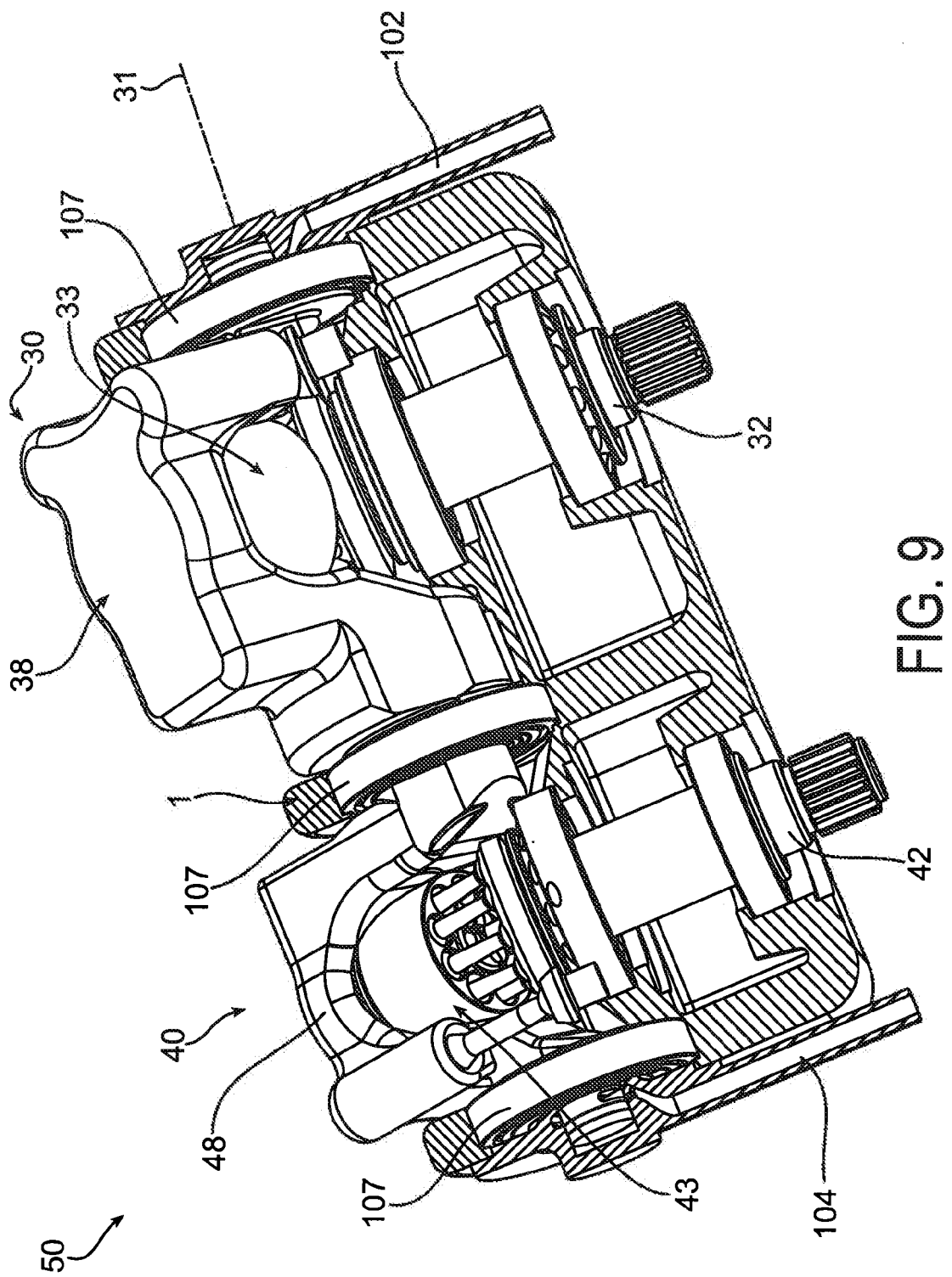
FIG. 9 is a perspective, partial sectional view of a hydrostatic assembly of the present invention with pump and motor units in a position of maximum displacement and being connected by the hydraulic unit yokes of FIGS. 3 and 6.

With reference to FIG. 9, a hydrostatic assembly 50 constructed in accordance with the present invention is illustrated. The hydrostatic assembly 50 includes a housing 1 in which two hydraulic units 30 and 40 are supported. In the embodiment illustrated, hydraulic unit 30 is a pump and hydraulic unit 40 is a motor. Alternatively, the hydraulic unit 30 may be a motor and hydraulic unit 40 may be a pump. Pump 30 includes an input shaft 32 that drives a pump rotating group, partially shown in FIG. 9 at 33. A pump yoke 38 is associated with the pump rotating group 33 and is rotatable about an axis 31 for varying the displacement of the pump 30. Similarly, motor 40 includes an output shaft 42 that is driven by a motor rotating group 43. A motor yoke 48 is associated with the motor rotating group 43 and is rotatable about axis 31 for varying the displacement of the motor 40. In other embodiments of the invention, one of the pump yoke or the motor yoke may be fixed for providing a fixed displacement while the other is rotatable for varying displacement.

The pump and motor yokes 38 and 48 each include at least one fluid passage that is in fluid communication with the associated rotating group. As will be described further below, the pump and motor yokes 38 and 48 may be coupled together to enable fluid exchange through the fluid passages and between the rotating groups. The pump and motor yokes 38 and 48 are free to turn independently of each other allowing independent control of the displacement for the pump 30 and motor 40. By exchanging fluid through the passages in the yokes 38 and 48, the hydrostatic assembly 50 of the present invention is smaller in size than comparable prior art assemblies having fluid conduits and manifolds for coupling the pump and motor. There is a wide range of possible mounting configurations of shafts 32 and 42 and, compared to known designs, the spacing between the shafts 32 and 42 can be much smaller in the present invention. FIG. 9 also illustrates tap fluid passages 102 and 104 for providing fluid, via orifices, for example, to flow passages 45 and 5, as further illustrated in FIGS. 13 and 14.

Figure 1:
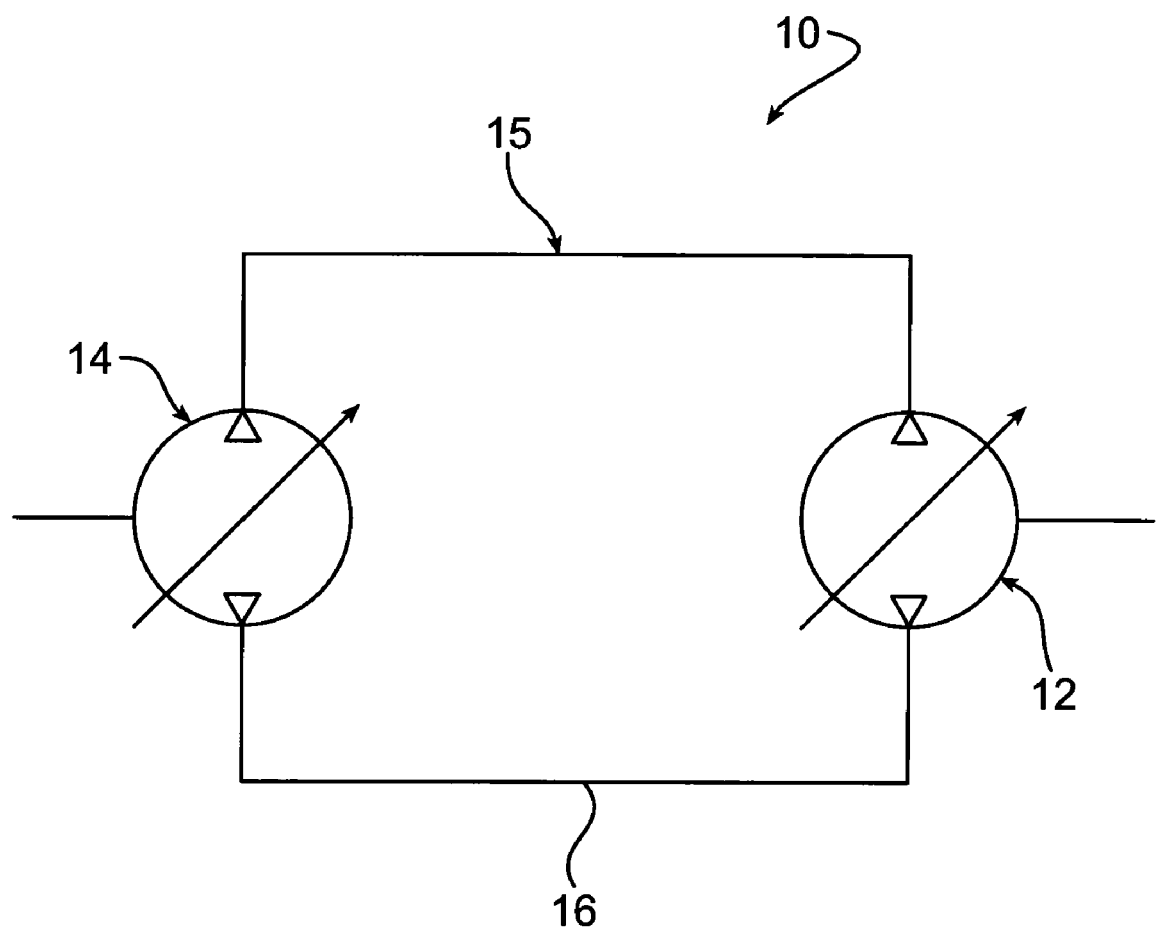
FIG. 1 is a schematic illustration of a prior art hydrostatic assembly.
Figure 2:
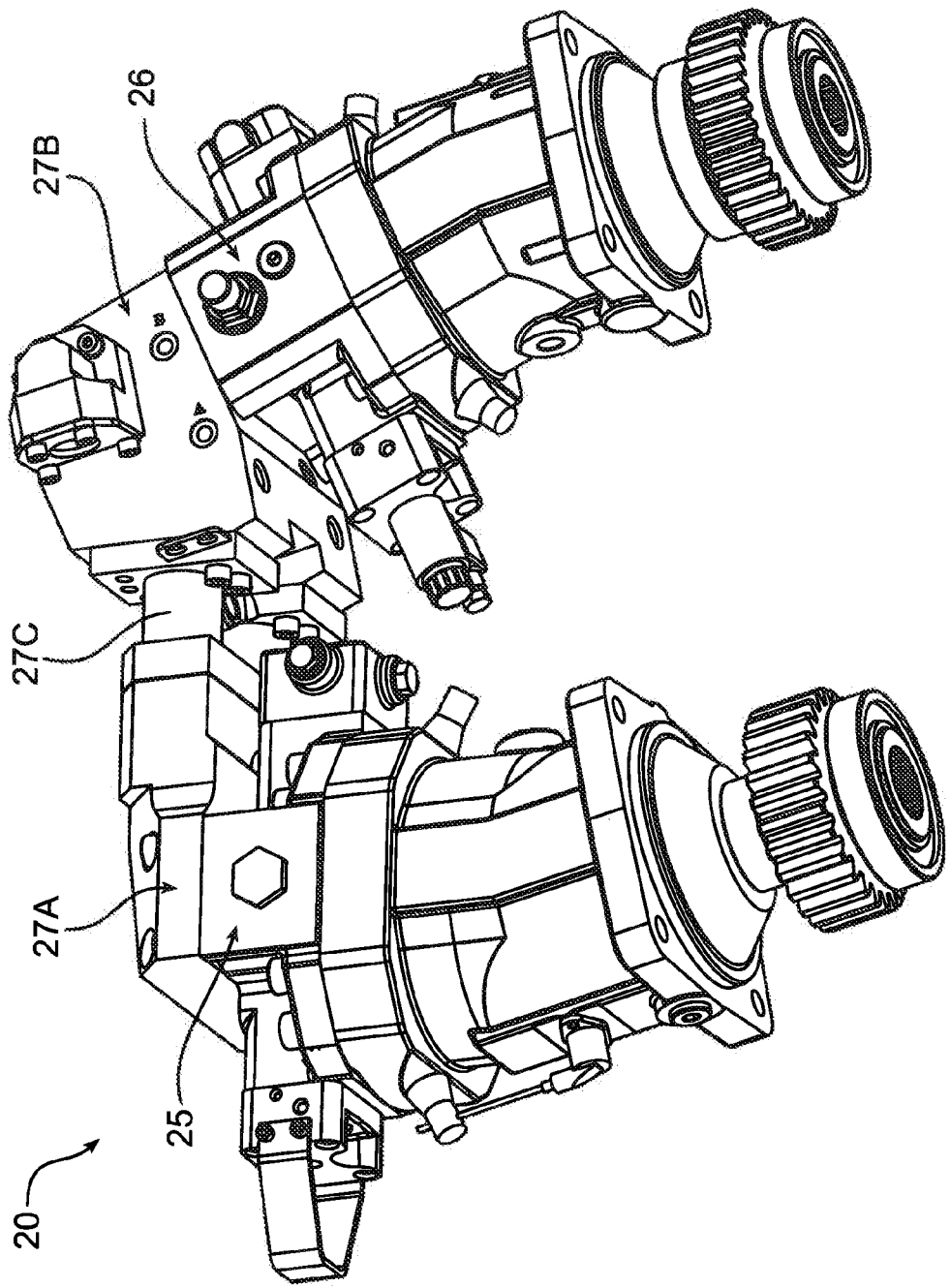
FIG. 2 is a perspective view of a prior art hydrostatic assembly having fixed manifolds.
Figure 3:
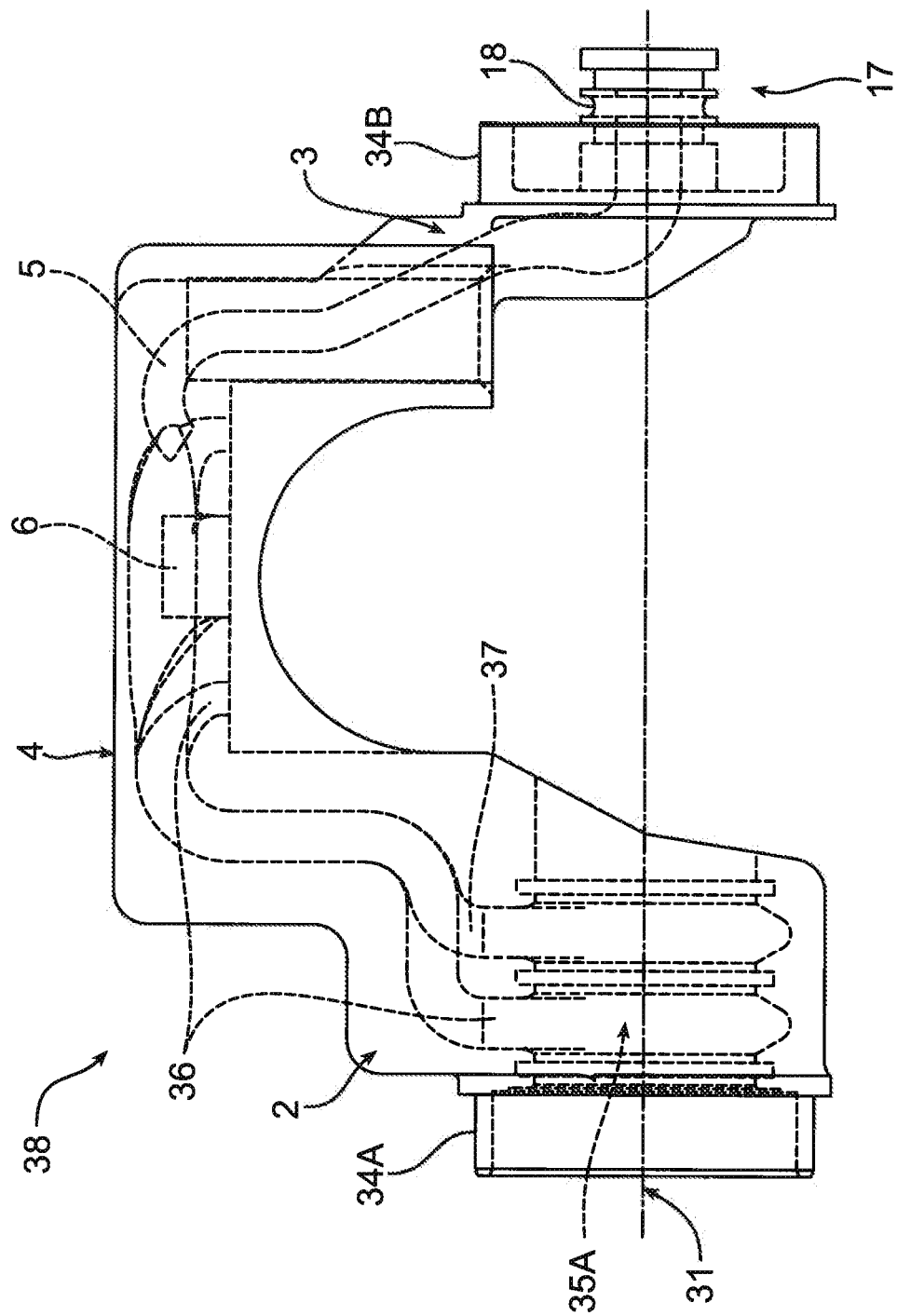
FIG. 3 is an elevation view of a hydraulic unit yoke having a female interconnect.

FIG. 3 illustrates the pump yoke 38. Dashed lines in FIG. 3 illustrate features not visible from an elevation view of the yoke 38. For this example, the pump yoke 38 includes a female interconnect or coupling portion, however, those skilled in the art should recognize that the pump yoke may have either a female interconnect or a male interconnect (as will be described with reference to FIGS. 6-8) for coupling with a corresponding motor yoke. The pump yoke 38 may be made as a single, monolithic piece, such as by casting or molding, and is preferably formed of metal, such as a ductile iron.

The yoke 38 has a central bucket portion 4 for supporting the rotating group 33. The bucket portion 4 includes a registration recess 6 for aiding in locating the rotating group 33 in the yoke 38. A registration post 7 (FIGS. 4 and 5) is received in the registration recess 6 for positioning the rotating group 33 relative to the bucket portion 4.

Figure 4:
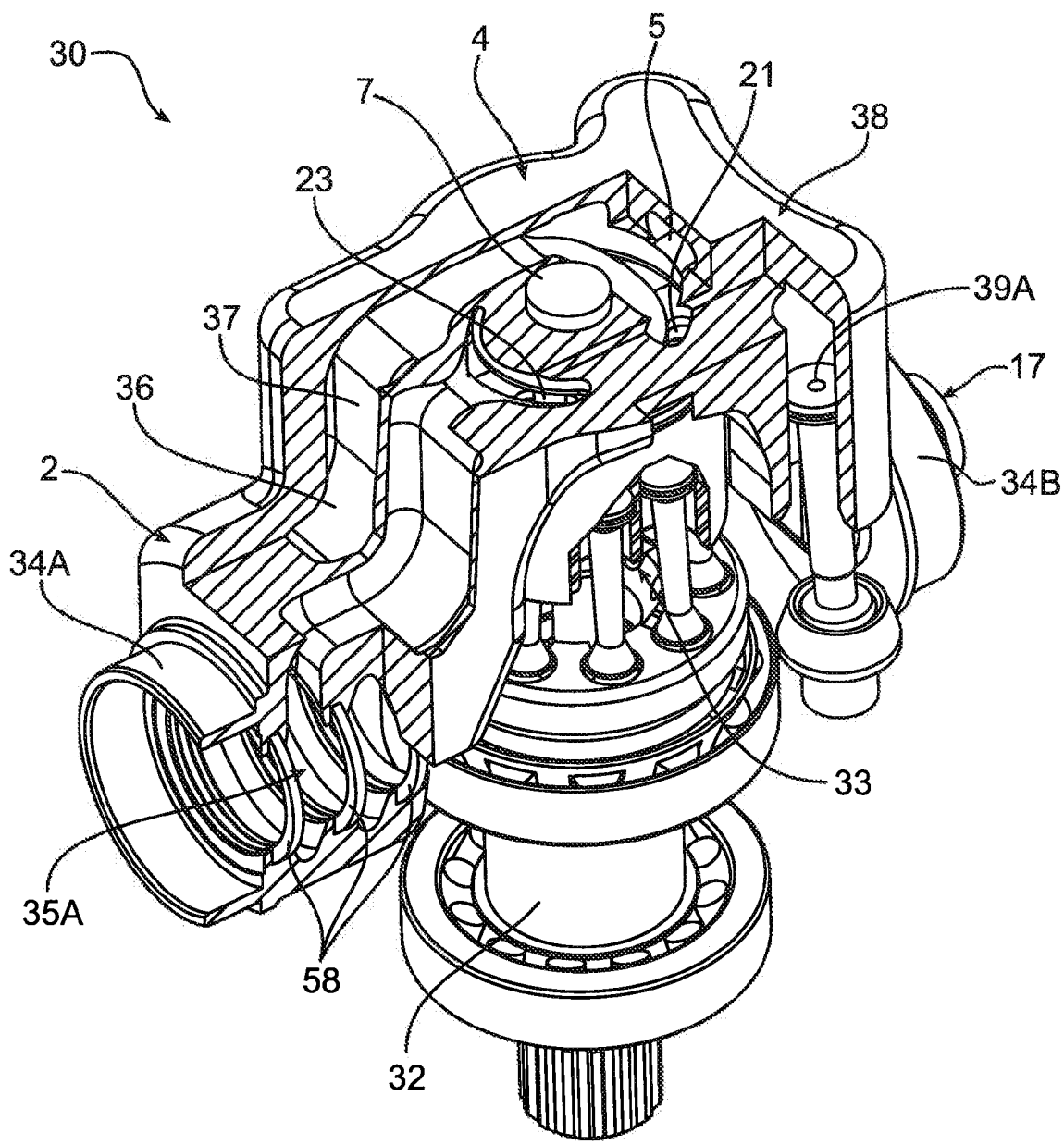
FIG. 4 is a perspective, partial sectional view of the hydraulic unit yoke of FIG. 3 positioned above a hydraulic rotating group.
Figure 5:
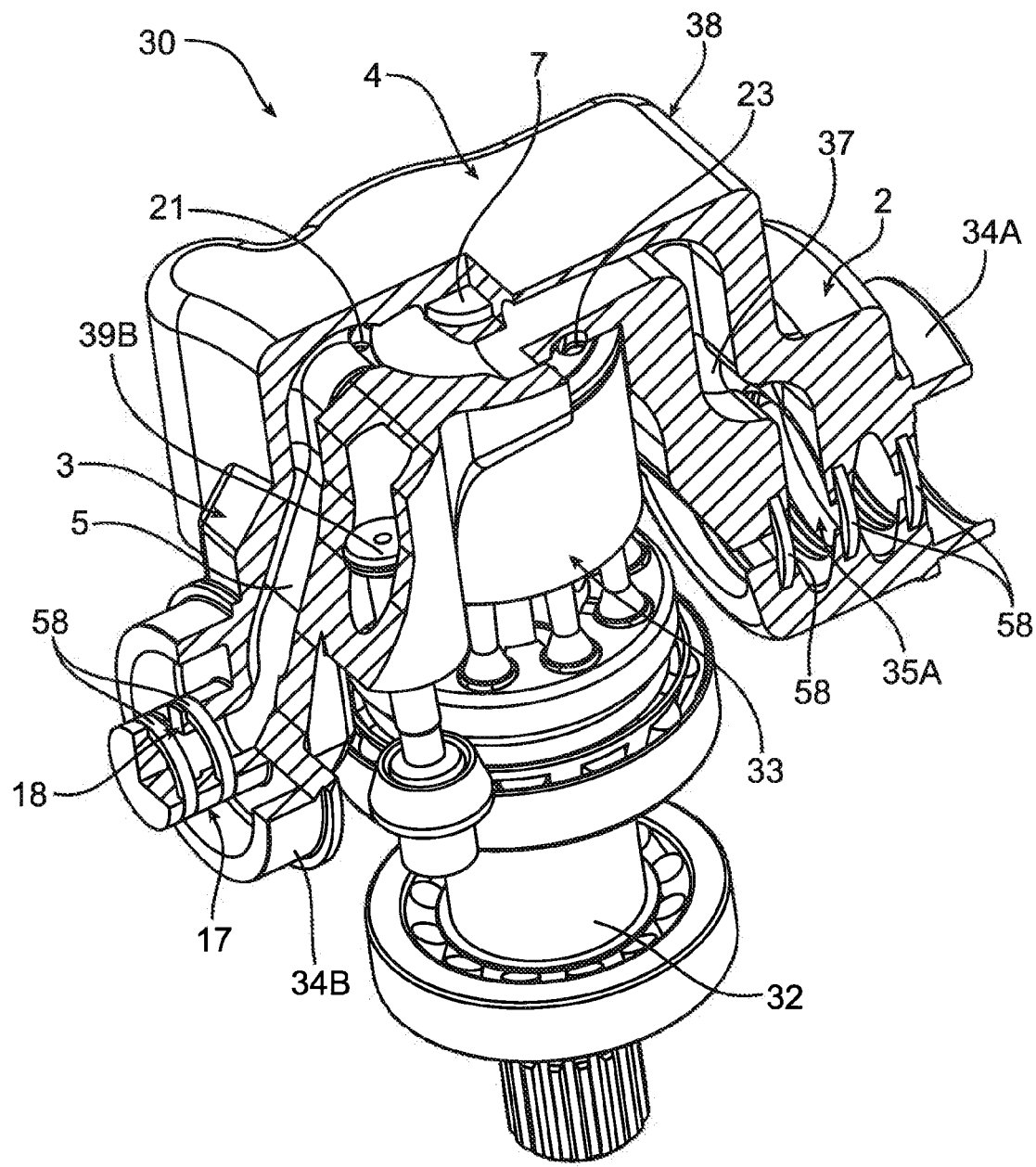
FIG. 5 is a perspective, partial sectional view of the hydraulic unit yoke of FIG. 3 from a side opposite that shown in FIG. 4.

The yoke 38 also includes arm portions 2 and 3 that extend from diametrically opposite sides of the bucket portion 4. It should be noted that arm portion 3 is optional. Arm portion 2 extends downwardly from the bucket portion 4, as viewed in FIG. 3, and terminates at a bearing trunnion 34A, which is centered on axis 31. A first coupling member or female interconnect 35A extends through the arm portion 2 along axis 31 from the bearing trunnion 34A. As best shown in FIG. 4, fluid passages 36 and 37 extend from the bucket portion 4, through arm portion 2 and terminate at the female interconnect 35A.

Openings to the fluid passages 36 and 37 located in the bucket portion 4 align with fluid ports 23 and 21, respectively, in the rotating group 33. At the female interconnect 35A, openings to the fluid passages 36 and 37 are axially spaced from one another along axis 31 and are separated from one another by rotary seals 58 received in and secured relative to the female interconnect 35A. Fluid is communicated through the passages 36 and 37 between the female interconnect 35A and the rotating group 33. During operation of the hydrostatic assembly 50, one of the fluid passages 36 or 37 carries high pressure fluid (in the range of 500 to 15,000 psi but commonly in the range of 3,000 to 7,000 psi) while the other fluid passage 37 or 36 carries lower pressure fluid (commonly in the range of 50 to 499 psi).

With reference again to FIG. 3, arm portion 3 extends downwardly from the bucket portion 4 and terminates at a bearing trunnion 34B, which is centered on axis 31. Bearing trunnions 34A and 34B are received in bearings 107 (FIG. 9) supported by the housing 1 for enabling rotation of pump yoke 38, with associated rotating group 33, about axis 31. One or more setting pistons 39A and 39B (FIGS. 4 and 5, respectively) or other suitable means, such as stepper motors, electric solenoids, or even manually adjusted cable or lever mechanism, may be used to rotate the yoke 38 relative to the housing 1. A fluid tap passage 5 extends through arm portion 3 and terminates at tap passage port 18 located on the circumference of a cylindrical interconnect 17 that extends outwardly along axis 31 in a location radially within the bearing trunnion 34B. The tap passage 5 may be in fluid communication with a fixed fluid port (not shown) in the housing 1 to provide make-up oil as well as to transfer oil for cooling.

Figure 6:
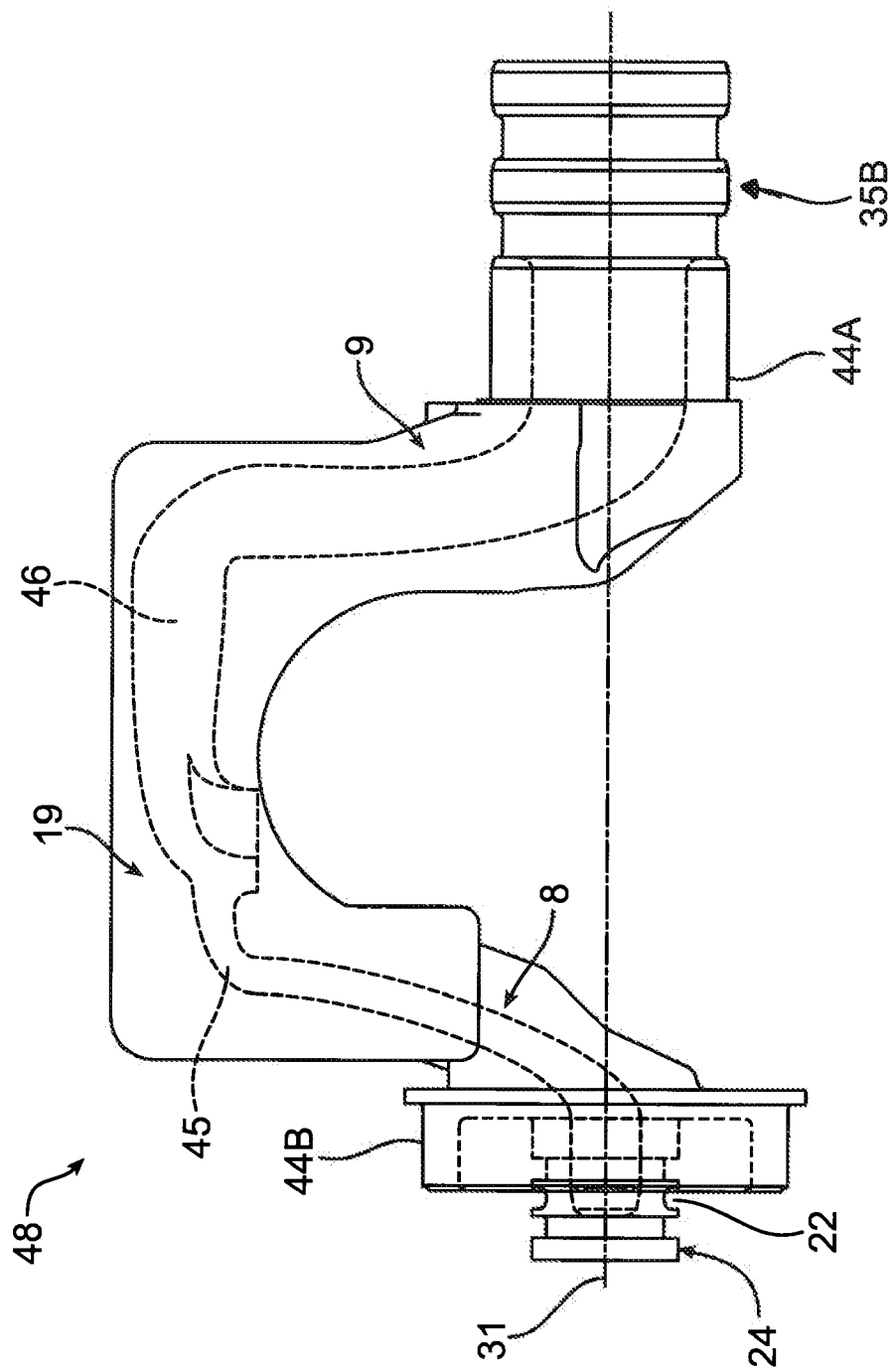
FIG. 6 is an elevation view of a hydraulic unit yoke having a male interconnect.
Figure 7:
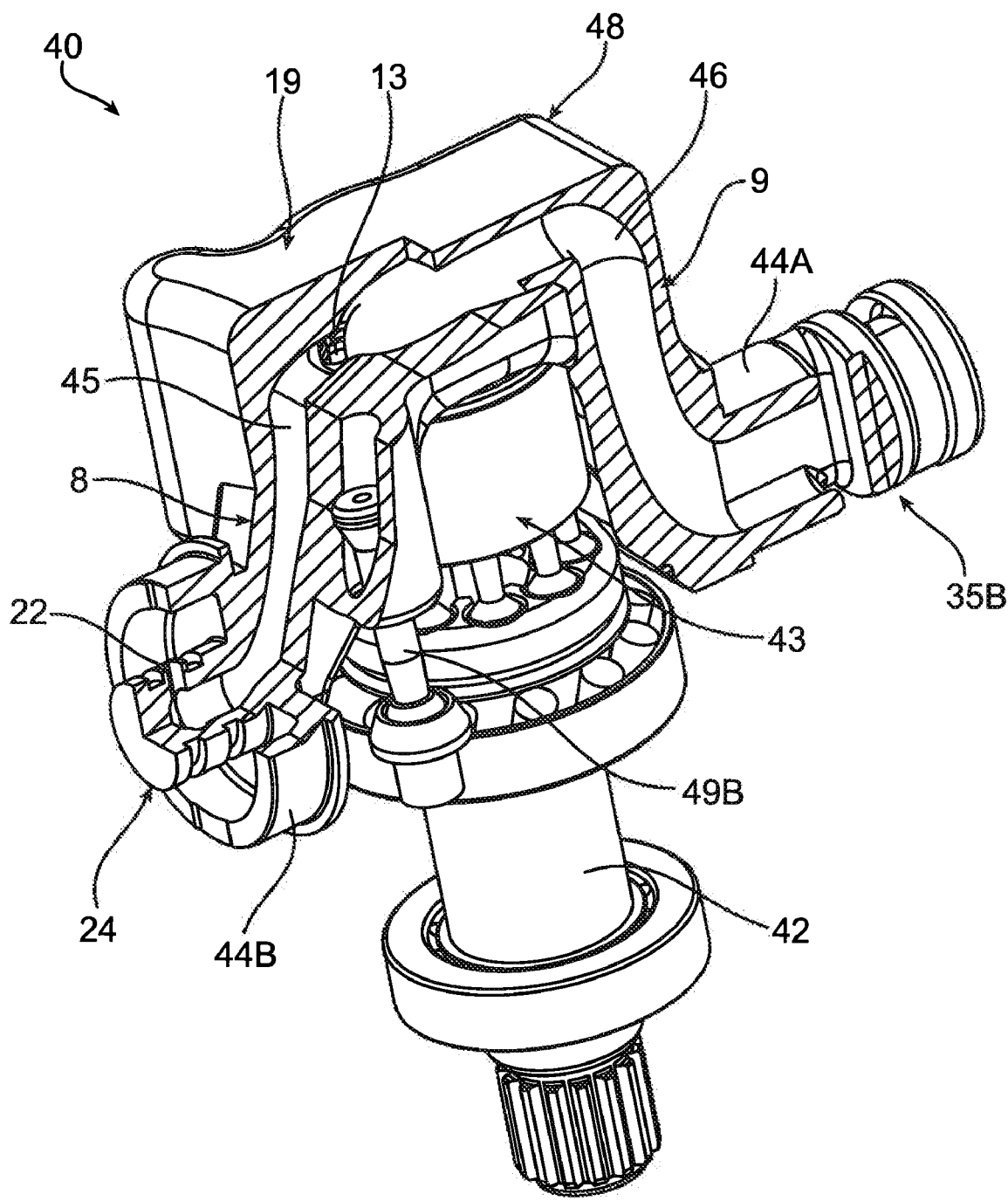
FIG. 7 is a perspective, partial sectional view of the hydraulic unit yoke of FIG. 6 positioned above a hydraulic rotating group.
Figure 8:
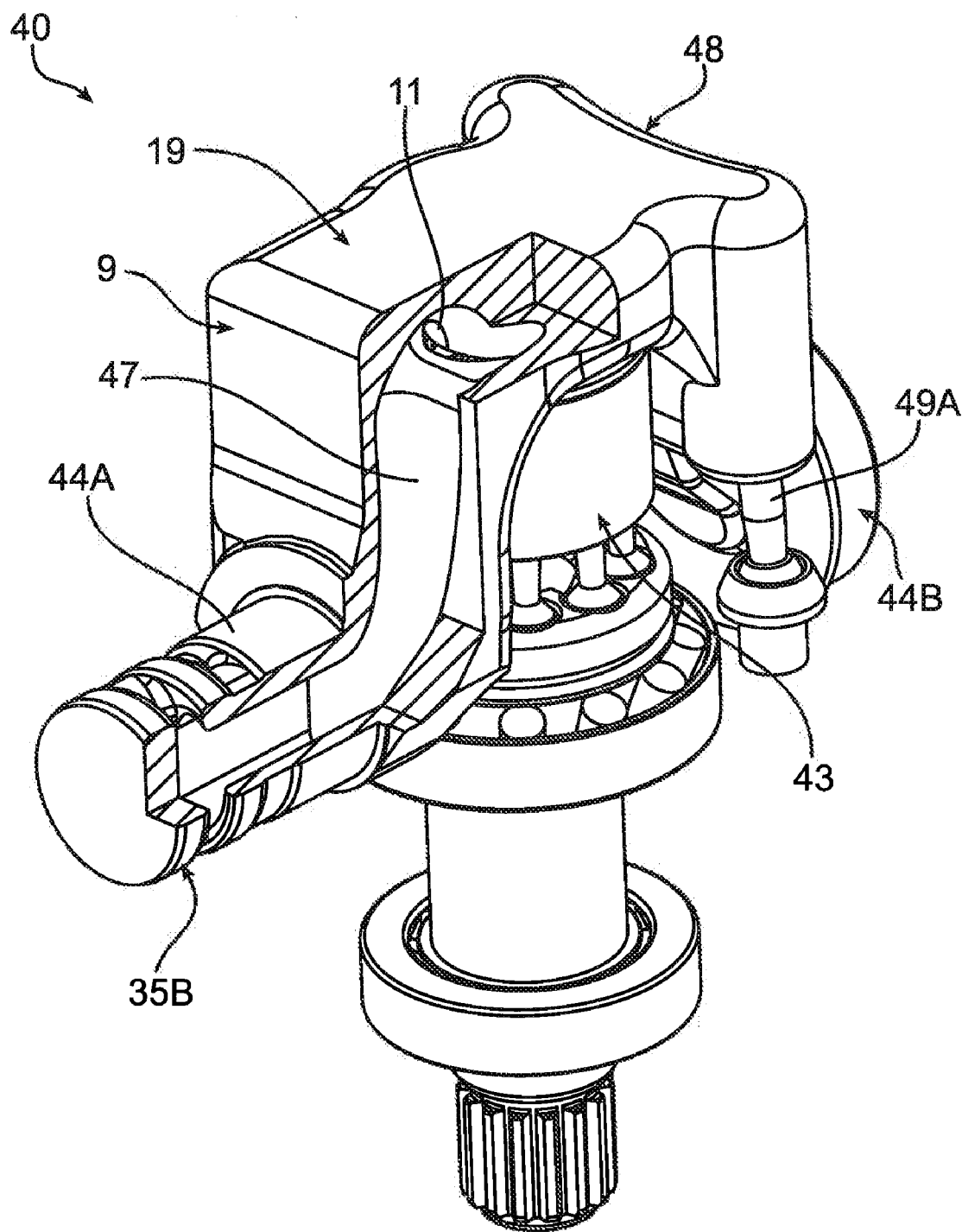
FIG. 8 is a perspective, partial sectional view of the hydraulic unit yoke of FIG. 6 from a side opposite that shown in FIG. 7.

FIGS. 6-8 illustrate the motor yoke 48. Dashed lines in FIG. 6 illustrate features not visible from an elevation view of the yoke 48. For this example, the motor yoke 48 will be described as having a male interconnect or coupling portion for coupling to the female interconnect of the pump yoke 38. The motor yoke 48 may be made as a single, monolithic piece, such as by casting or molding, and is preferably formed of metal, such as a ductile iron.

The motor yoke 48 has a central bucket portion 19 for supporting the rotating group 43. The bucket portion 19 may include a registration recess, similar to recess 6 in FIG. 3, for receiving a corresponding registration post for aiding in locating the rotating group 43 in the yoke 48. The yoke 48 also includes arm portions 8 and 9 that extend from diametrically opposite sides of the bucket portion 19. It should be noted that arm portion 8 is optional.

Arm portion 9 extends downwardly from the bucket portion 19, as viewed in FIG. 6, and terminates at a bearing trunnion 44A, which is centered on axis 31. A generally cylindrical extension (or male interconnect) 35B extends axially outwardly of the bearing trunnion 44A in a direction opposite the bucket portion 19. Two fluid passages 46 (FIG. 7) and 47 (FIG. 8) extend from the bucket portion 19, through arm portion 9 and terminate at radial openings that are circumferentially spaced about the circumference of the male interconnect 35B. The fluid passages 46 and 47 in the bucket portion 19 align with fluid ports 13 (FIG. 7) and 11 (FIG. 8), respectively, in the rotating group 43. At the male interconnect 35B, the radial openings to the fluid passages 46 and 47 are axially spaced from one another along axis 31. Fluid is communicated through the passages 46 and 47 between the male interconnect 35B and the rotating group 43. During operation of the hydrostatic assembly 50, one of the fluid passages 46 or 47 carries high pressure fluid (in the range of 500 to 15,000 psi but commonly in the range of 3,000 to 7,000 psi) while the other fluid passage 47 or 46 carries lower pressure fluid (commonly in the range of 50 to 499 psi).

With reference again to FIG. 6, arm portion 8 extends downwardly from the bucket portion 19 and terminates at a bearing trunnion 44B, which is centered on axis 31. Bearing trunnions 44A and 44B are supported for rotation relative to the housing 1 for enabling rotation of motor yoke 48, with associated rotating group 43, about axis 31. One or more setting pistons 49A (FIG. 8) and 49B (FIG. 7) or other suitable means, such as stepper motors, electric solenoids, or even manually adjusted cable or lever mechanism, may be used to rotate the yoke 48 relative to the housing 1. A fluid tap passage 45 extends through arm portion 8 and terminates at tap passage port 22 located on the radial circumference of a cylindrical interconnect 24 that extends outwardly along axis 31 in a location radially within the bearing trunnion 44B. The tap passage 45 may be in fluid communication with a fixed fluid port (not shown) in the housing 1 to provide make-up oil as well as to transfer oil for cooling.

Figure 10:
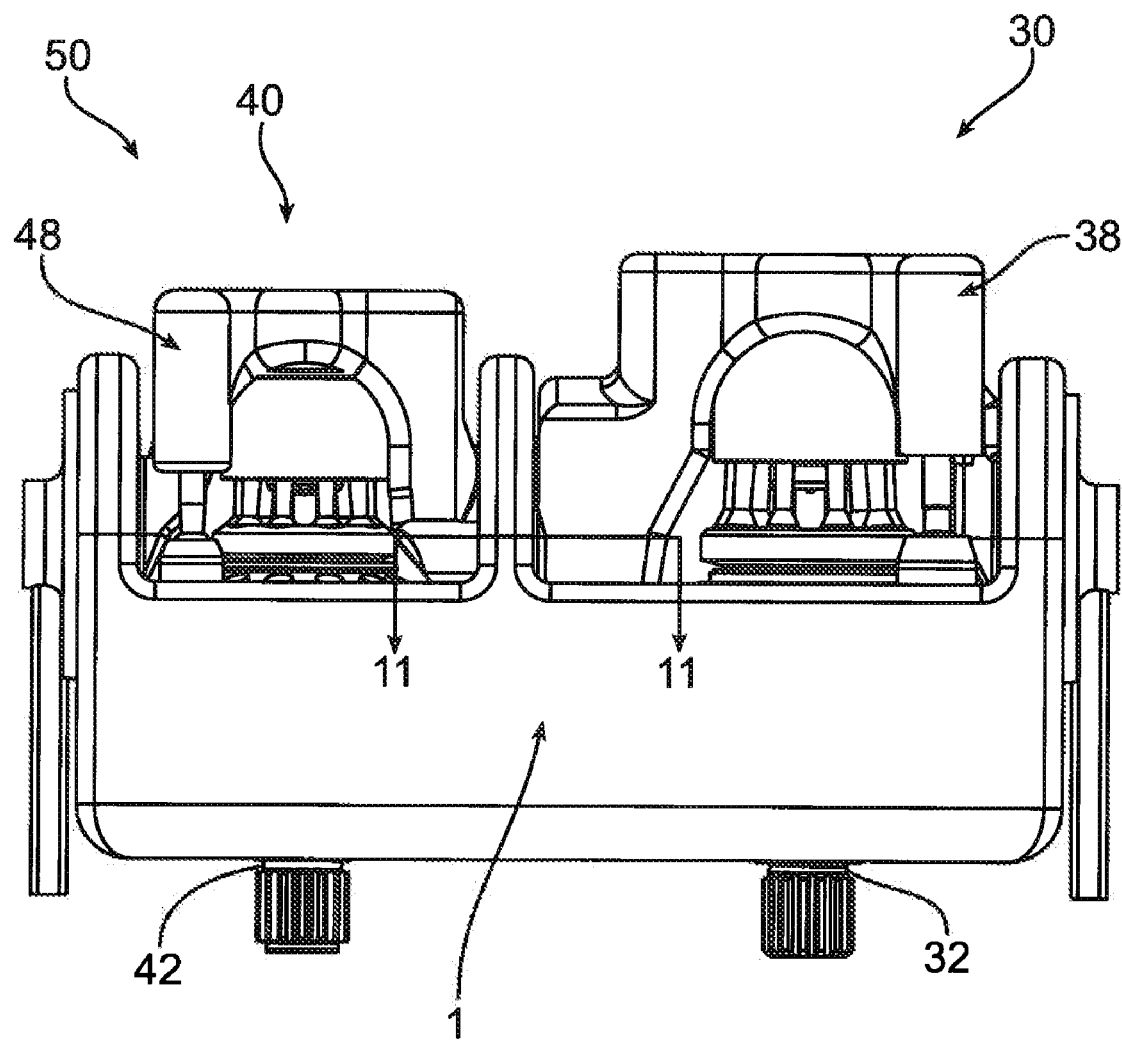
FIG. 10 is an elevation view of the hydrostatic assembly of the present invention with pump and motor units at zero effective displacement.
Figure 11:
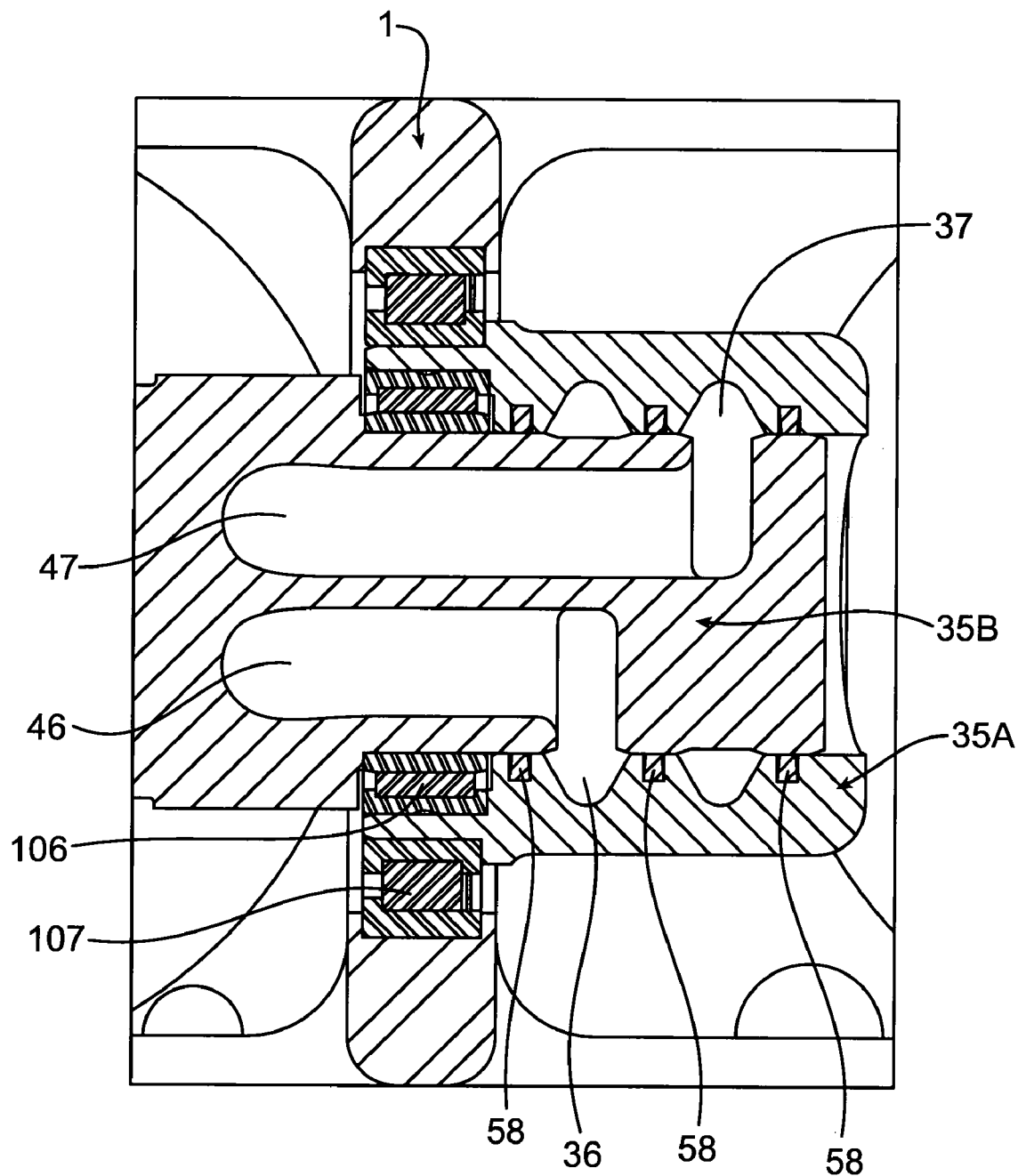
FIG. 11 is view taken along line 11-11 as shown in FIG. 10.

The yokes 38 and 48 of FIGS. 3 and 6 are adapted to be coupled together or interconnected. When coupled together, the male interconnect 35B of yoke 48 is inserted into the female interconnect 35A of yoke 38 so that passage 36 is placed in fluid communication with passage 46 and passage 37 is placed in fluid communication with passage 47. FIGS. 9 and 10 show the yokes 38 and 48 coupled together. FIG. 11 is a partial cutaway view along line 11-11 in FIG. 10 and shows the male interconnect 35B received in the female interconnect 35A. The connection of passages 36 and 46 and passages 37 and 47 is shown in FIG. 11. FIG. 11 also shows the rotary seals 58 for sealing between the male interconnect 35B and the female interconnect 35A, and further sealing the high and low pressure passages from each other. Bearings 106 and 107 for supporting rotation of the yokes 38 and 48 relative to the housing 1 also are shown in FIG. 11.

Figure 12:
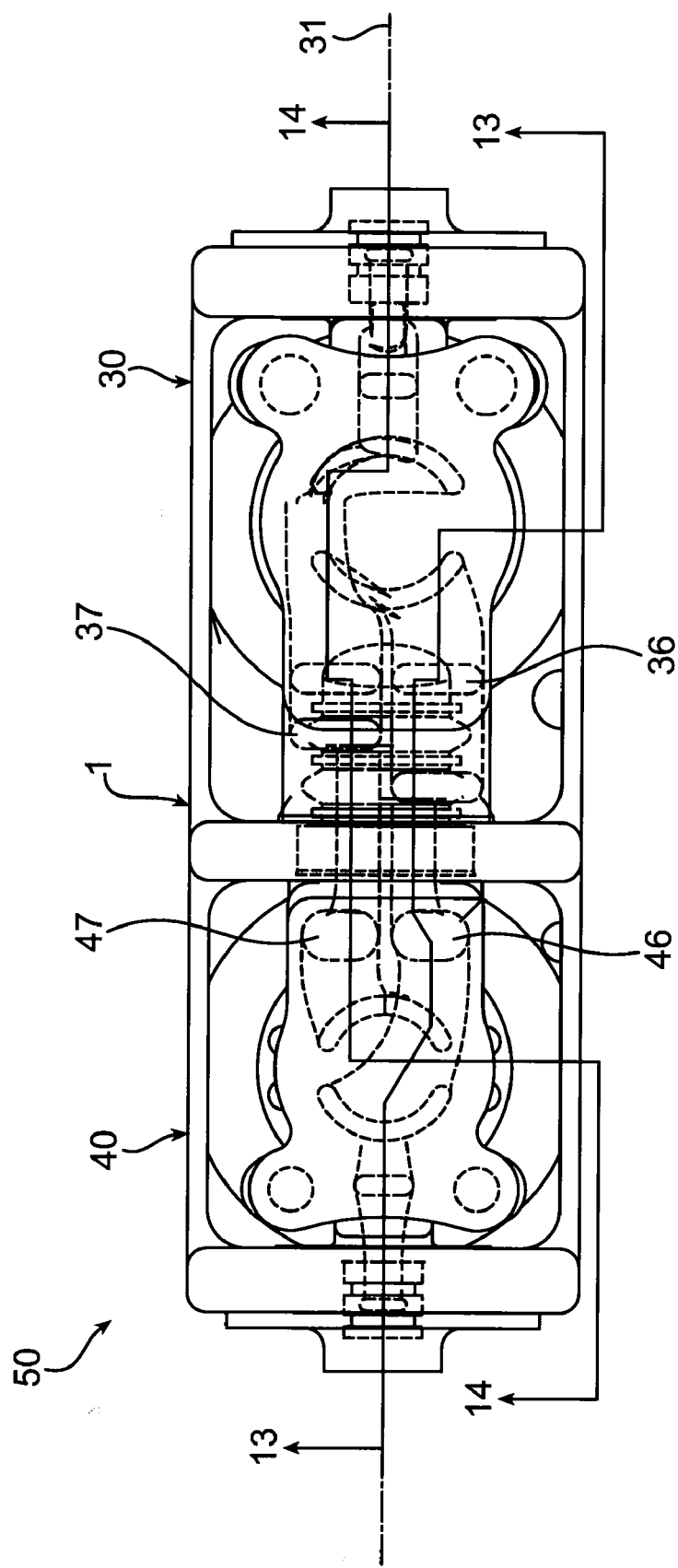
FIG. 12 is a top view of the hydrostatic assembly of the present invention with dashed lines showing elements not visible from the top view.
Figure 13:
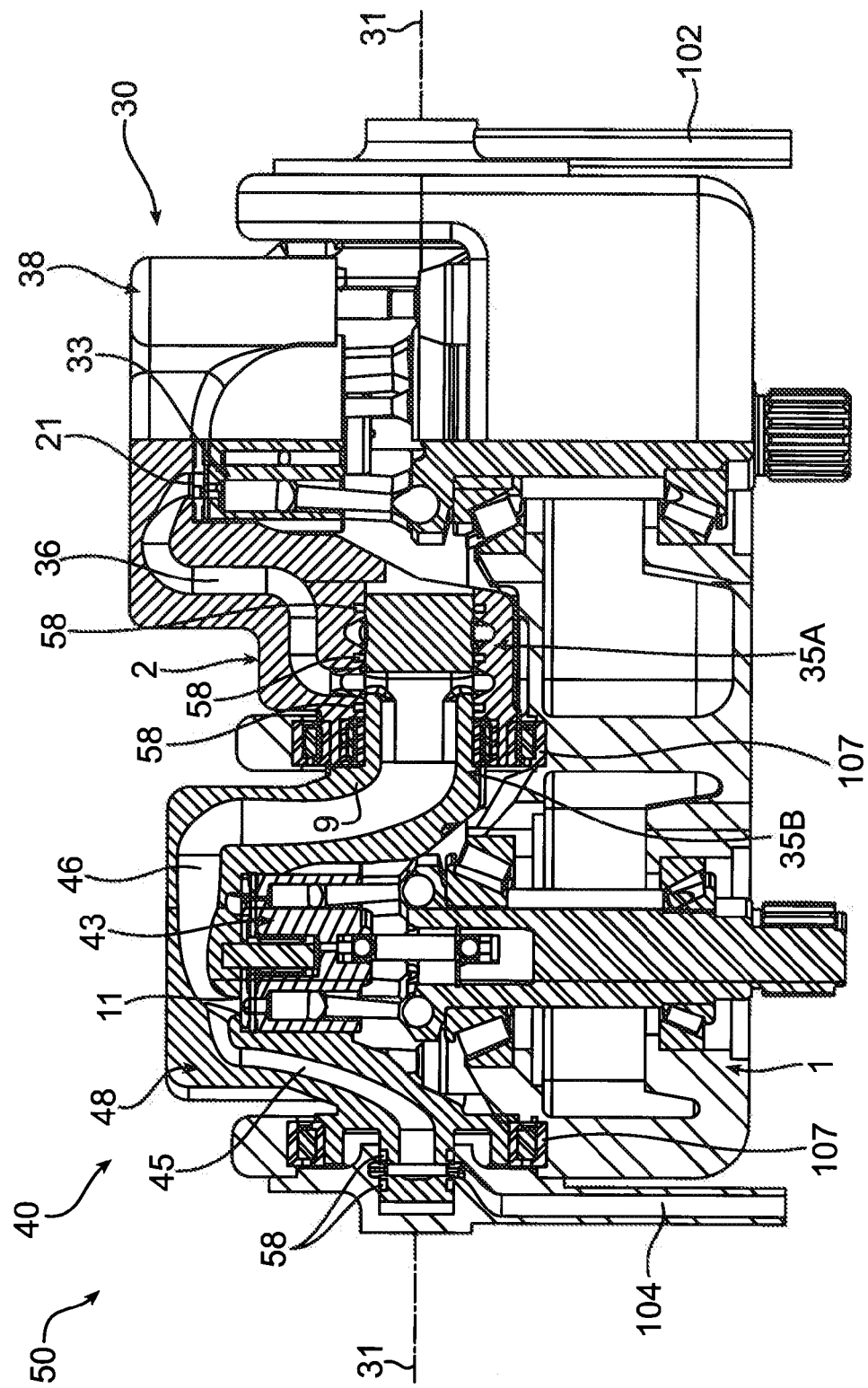
FIG. 13 is view taken along line 13-13 in FIG. 12.
Figure 14:
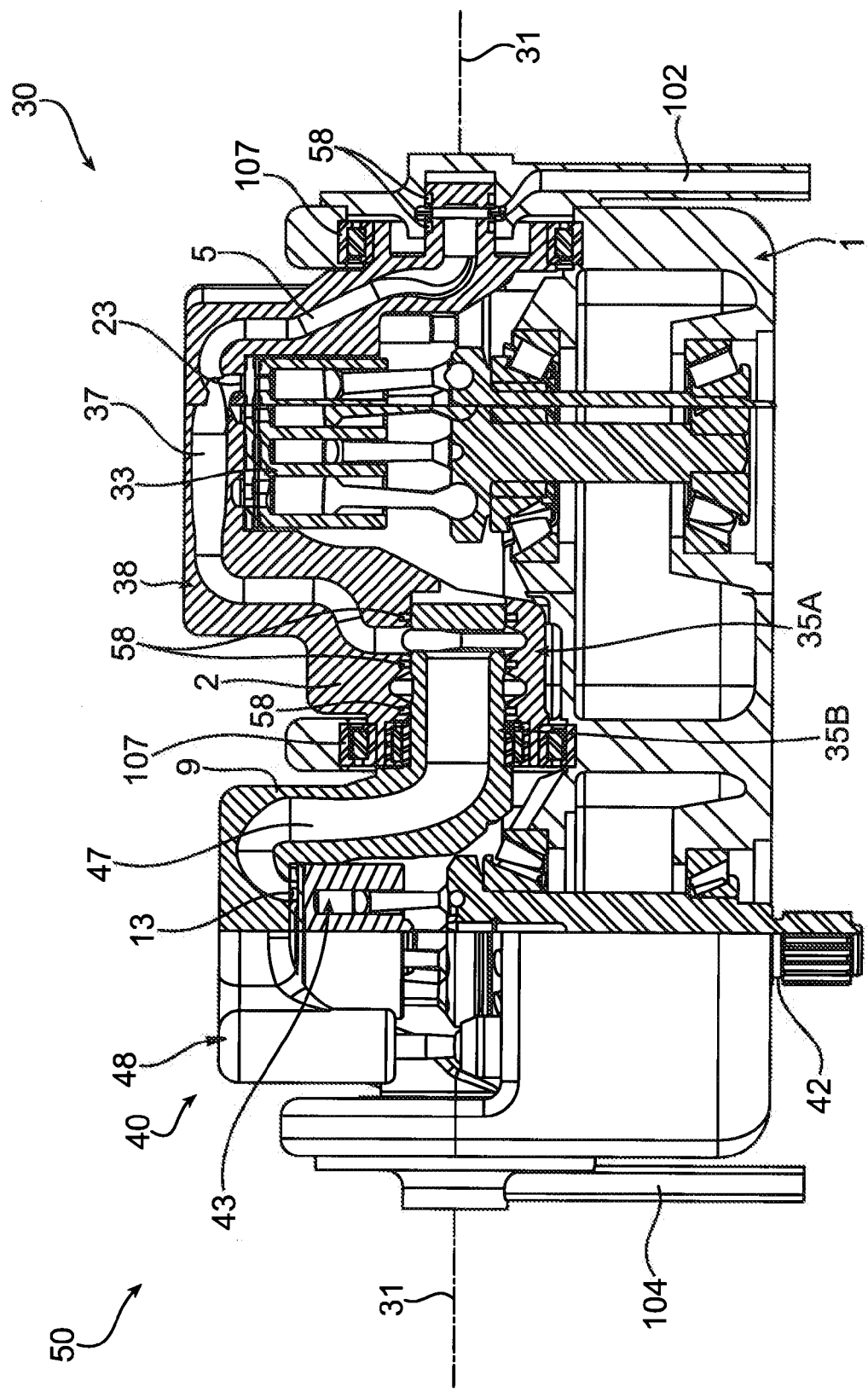
FIG. 14 is view taken along line 14-14 in FIG. 12.

FIGS. 12, 13, and 14 show further illustrations of the assembled hydrostatic assembly 50 of the present invention. Dashed lines in FIG. 12 illustrate features of the yokes 38 and 48 not visible from the top view. The partial sectional view of FIG. 13 illustrates a continuous fluid flow path from tap fluid passage 45 to rotating group 43 and from rotating group 43 through passages 46 and 36 to rotating group 33. Similarly, the sectional view of FIG. 14 illustrates a continuous fluid flow path from tap fluid passage 5 to rotating group 33 and from rotating group 33 through passages 37 and 47 to rotating group 43.

Figure 15:
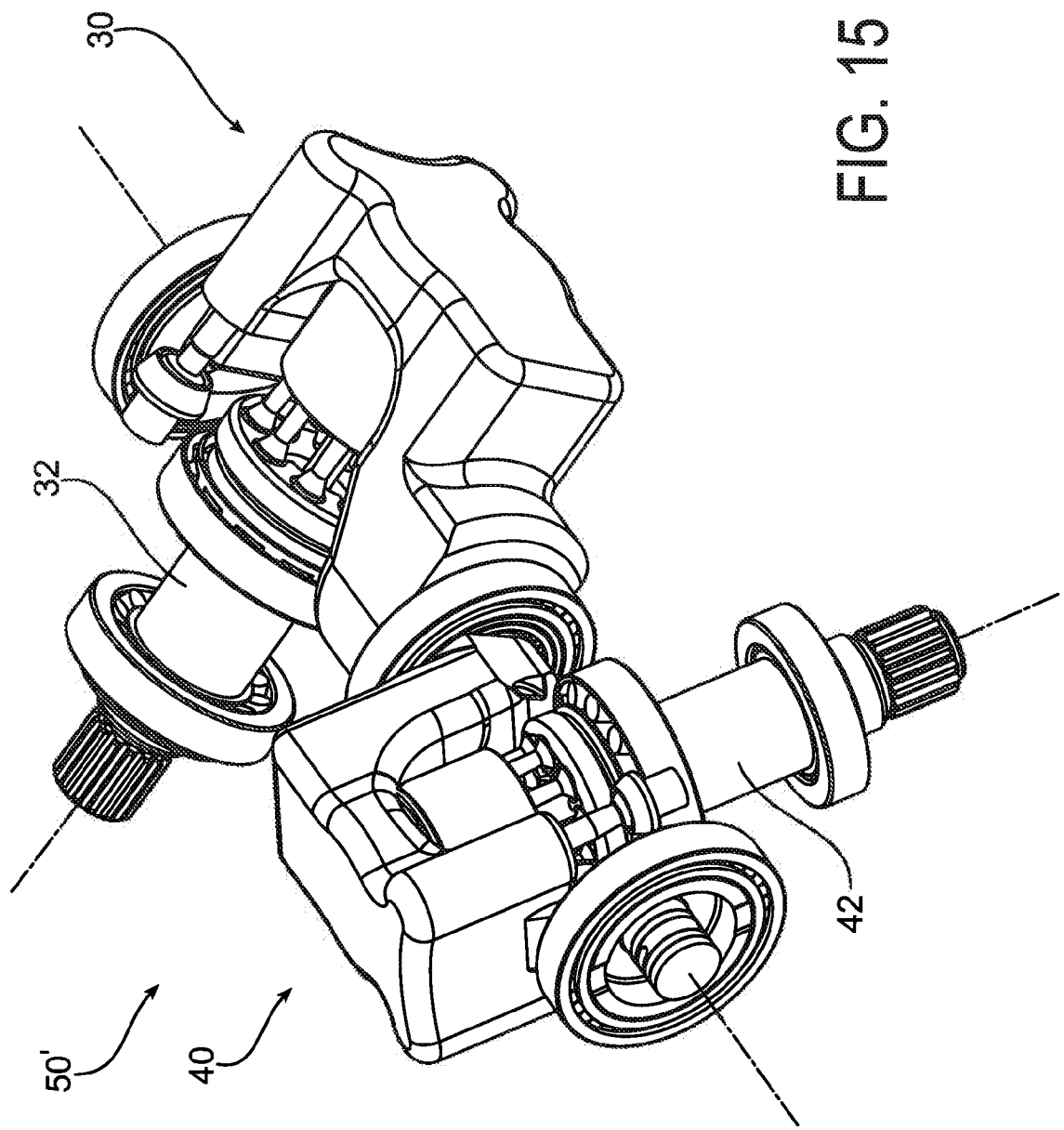
FIG. 15 is a perspective view of a portion of a second embodiment of a hydrostatic assembly being connected by the hydraulic unit yokes of FIGS. 3 and 6.

FIG. 15 illustrates a second embodiment of the hydrostatic assembly of the present invention. The hydrostatic assembly 50' of FIG. 15 is shown without the housing to illustrate that shafts 32 and 42 of the pump 30 and motor 40 are angled relative to one another as opposed to the parallel configuration shown in FIG. 9.

Figure 16:
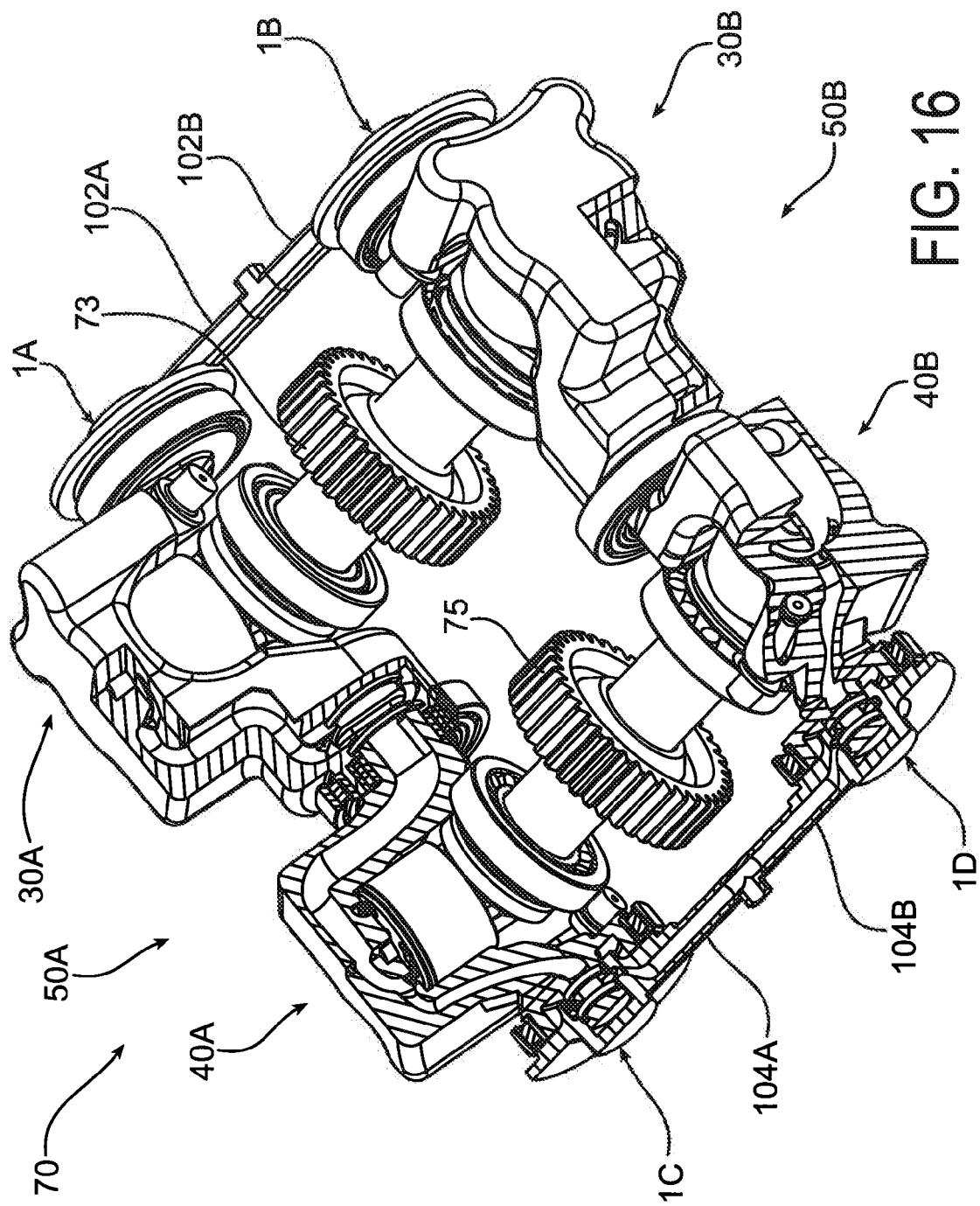
FIG. 16 is a perspective, partial sectional view of a dual hydrostatic assembly showing tap fluid conduits.

For additional drive power, a dual hydrostatic assembly can be configured by combining two hydrostatic assemblies of the invention. FIG. 16 illustrates an embodiment of a dual hydrostatic module 70 that combines two hydrostatic assemblies 50A and 50B as previously described. In the embodiment of FIG. 16, the shafts of the pumps 30A and 30B are coupled together, or alternatively a common shaft is used. A gear 73 is associated with the pump shafts. Likewise, the shafts of the motors 40A and 40B are coupled together, or a common shaft is used. A gear 75 is associated with the motor shafts. FIG. 16 also illustrates fluid conduits 102A and 102B for balancing fluid pressure between opposing pumps 30A and 30B and fluid conduits 104A and 104B for balancing fluid pressure between opposing motors 40A and 40B. The fluid conduits 102A, 102B, 104A, and 104B may be integrated into sections 1A, 1B, 1C, and 1D of an external housing, as shown, with the housing having receptacles corresponding with cylindrical interconnects 17 and 24 allowing fluid communication between tap passage ports (such as port 22 in FIG. 6) and associated fluid conduits 102A, 102B, 104A, and 104B.

In a closed-loop hydraulic system, it is useful to boost supply line pressure to add make-up oil to the system for replacing fluid lost due to leakage. This is accomplished by tapping into one of the fluid passages 102A, 102B, 104A or 104B and supplying relatively low pressure make-up fluid. It is also useful to include in closed-loop hydraulic systems a hot oil flushing sub-system to remove a small amount of oil from the main drive loop for cooling. In the invention, flushing may also be accomplished by the tap fluid passages 102A, 102B, 104A and 104B. Conventional closed-loop hydraulic systems typically have external plumbing for providing make-up fluid and for flushing and hence, have no need to have integrated passages in the yokes. In this embodiment of the invention, there is no external manifold or plumbing between the pump and motor, therefore the tap fluid passage is incorporated in each yoke with a separate fluid interconnect. Valves (not shown) in the external housing may be used to control the flow into and out of the tap fluid passages 102A, 102B, 104A and 104B.

Figure 17:
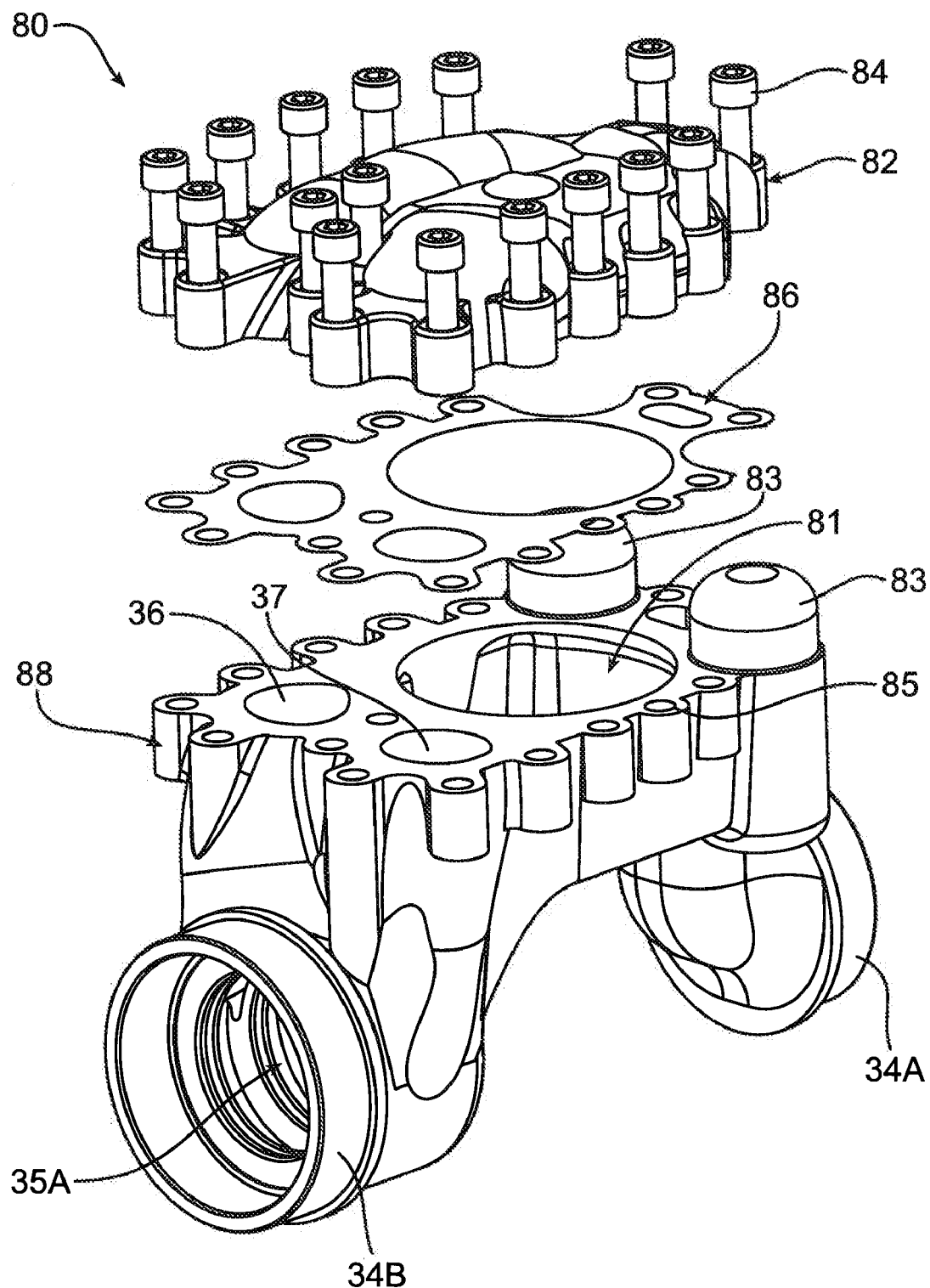
FIG. 17 is an exploded, perspective view of a two-part yoke with female interconnect.
Figure 18:
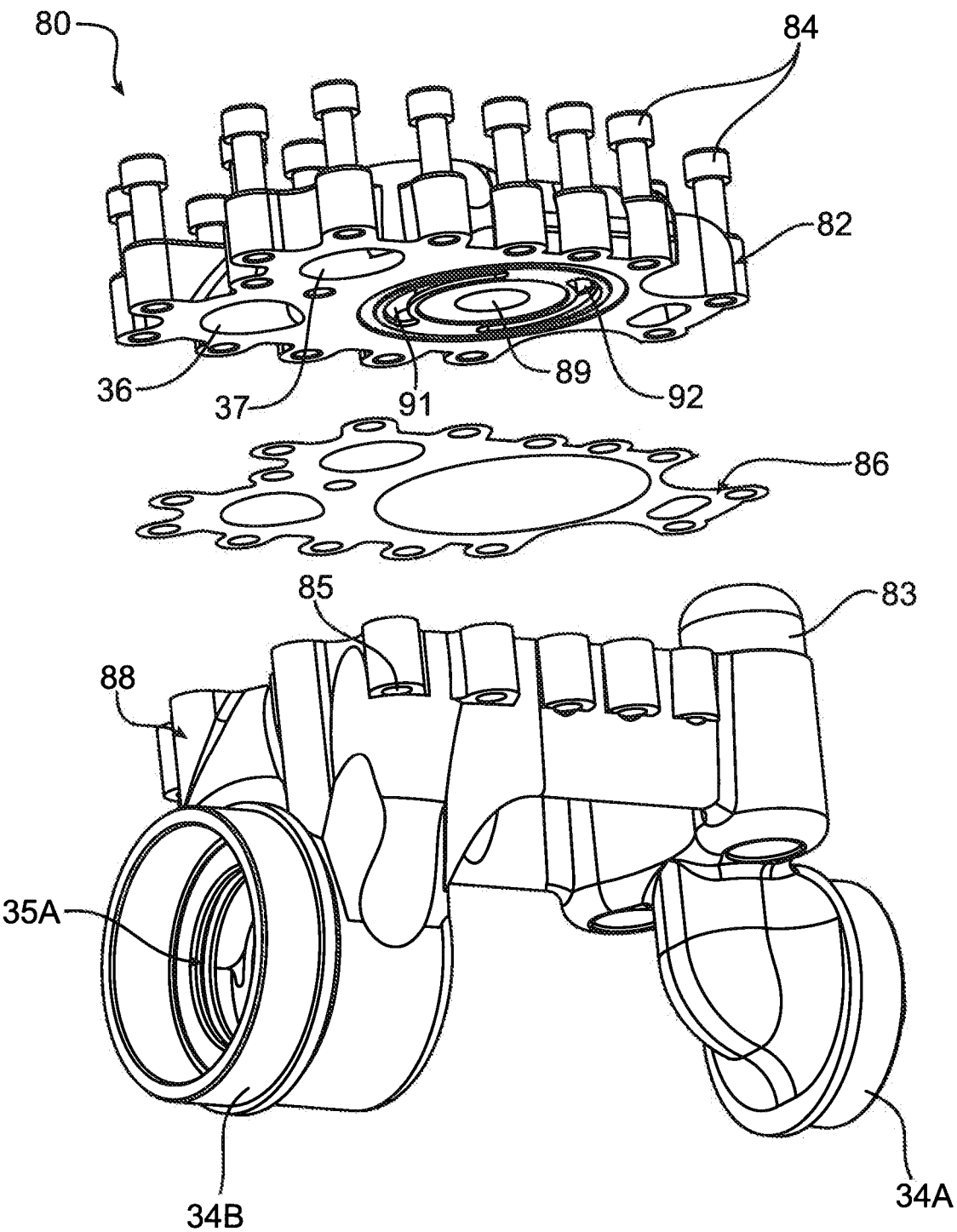
FIG. 18 is another exploded perspective view of the two-part yoke of FIG. 17.

FIGS. 17 and 18 illustrate a two-part yoke design. Although FIGS. 17 and 18 illustrate a yoke 80 having female interconnect 35A, a yoke with a male interconnect also may be constructed with this two-part design. The yoke 80 includes a top cover 82 and base portion 88 that are assembled together with fasteners 84. Holes for receiving the fasteners 84 are formed in the top cover 82 and the base portion 88. A gasket 86 is interposed between the top cover 82 and the base portion 88 to provide a fluid tight seal. Passages, shown in FIGS. 17 and 18 at passages 36 and 37, are divided into two separate portions that are connected together when the top cover 82 is affixed to the base portion 88. The associated rotating group (not shown) extends through a hole 81 in the base portion 88 so that ports of the rotating group can be fluidly connected to ports 91 and 92 (FIG. 18) associated with passages 36 and 37. Setting pistons for the yoke 80 are housed in silo portions 83 of the base portion 88. The silo portions 83 may be cast as one piece with the base portion 88 or may be separate structures that are inserted into corresponding structures in the base portion.

Figure 19:
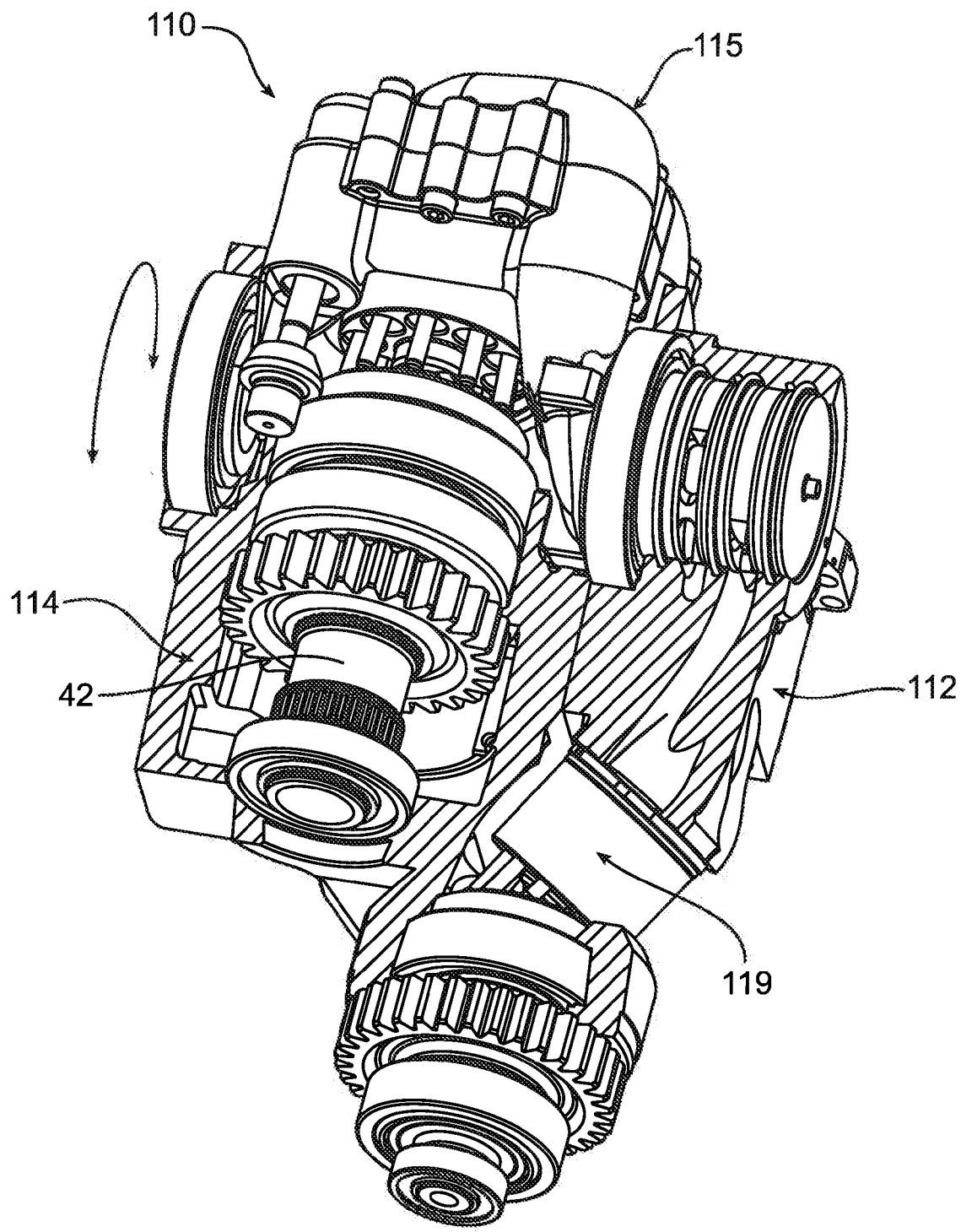
FIG. 19 is a perspective, partial sectional view of a hydrostatic assembly with one fixed displacement hydraulic unit and one variable displacement hydraulic unit.

Some hydrostatic assembly configurations may require that one of the pump or motor have a fixed displacement while the other has a variable displacement. The yokes described previously may also be used with a fixed displacement pump or motor, as illustrated in FIG. 19. In FIG. 19, hydrostatic assembly 110 includes a fixed yoke 112 associated with rotating group 119 and a variable yoke 115 (shown as a two-piece yoke), both mounted in a housing 114. Alternatively, the fixed yoke 112 may be integral to the housing 114. As previously described, fluid passages in the fixed yoke 112 are in fluid communication with fluid passages in the rotatable or variable yoke 115.

Although the principles, embodiments and operation of the present invention have been described in detail herein, this is not to be construed as being limited to the particular illustrative forms disclosed. For example, the pump yoke may include the male interconnect and the motor yoke may include the female interconnect. Also, the yokes may be formed from more than two pieces. Still further, one or both of the passage ports in the male and female interconnects may be directed in an axial direction as opposed to the radial direction. It will thus become apparent to those skilled in the art that these and various other modifications of the embodiments herein can be made without departing from the spirit or scope of the invention.

What is claimed is:
1. A hydrostatic assembly comprising:
a pump that includes a yoke and an associated rotating group for receiving hydraulic fluid and outputting hydraulic fluid under pressure, the pump yoke having a bucket portion and an arm portion, at least one fluid passage extending through the pump yoke for fluid communication with the pump rotating group;
a motor that includes a yoke and an associated rotating group for receiving hydraulic fluid under pressure and outputting mechanical energy, the motor yoke having a bucket portion and an arm portion, at least one fluid passage extending through the motor yoke for fluid communication with the motor rotating group;

the arm portion of the pump yoke and the arm portion of the motor yoke have associated coupling portions for placing the at least one fluid passage in the pump yoke in direct fluid communication with the at least one fluid passage in the motor yoke, the coupling portions being rotatable relative to one another to enable relative rotation between the pump yoke and motor yoke so that at least one of the pump and motor has a variable displacement.

2. The hydrostatic assembly of claim 1 wherein both the pump yoke and the motor yoke are rotatable to enable variable displacement of both the pump and the motor, the pump yoke and motor yoke being rotatable independently of one another.

3. The hydrostatic assembly of claim 2, further comprising means for independently positioning each of the yokes for varying displacement of the pump and motor.

4. The hydrostatic assembly of claim 3, wherein the positioning means includes setting pistons.

5. The hydrostatic assembly of claim 1 wherein the associated coupling portions of the pump yoke and the motor yoke include a male interconnect and an associated female interconnect, the male interconnect being received by the female interconnect to couple the pump yoke and the motor yoke.

6. The hydrostatic assembly of claim 5 where the male interconnect includes an outer surface having at least one radial opening and, the female interconnect includes an inner surface having at least one radial opening for fluid communication with the radial opening of the male interconnect.

7. The hydrostatic assembly of claim 1 wherein the at least one fluid passage extending through the pump yoke extends through both the bucket portion and the arm portion of the pump yoke and, the at least one fluid passage extending through the motor yoke extends through both the bucket portion and the arm portion of the motor yoke.

8. The hydrostatic assembly of claim 1, wherein the coupling portions include corresponding ports directed in one of a radial or axial direction.

9. The hydrostatic assembly of claim 1 wherein two fluid passages extend through the pump yoke and two fluid passages extend through the motor yoke, a first fluid passage of the pump yoke being in direct fluid communication with a first fluid passage of the motor yoke and a second fluid passage of the pump yoke being in direct fluid communication with a second fluid passage of the motor yoke.

10. The hydrostatic assembly of claim 9 wherein the associated coupling portions of the pump yoke and the motor yoke include a male interconnect and an associated female interconnect, the male interconnect being received by the female interconnect to fluidly couple the pump yoke and the motor yoke.

11. The hydrostatic assembly of claim 10 wherein the male interconnect includes an outer surface having at least two radial openings, one associated with each fluid passage extending through the respective arm portion, and the female interconnect includes an inner surface having at least two radial openings, one associated with each fluid passage extending through the respective arm portion and also associated with a respective one of the two radial openings on the outer surface of the male interconnect.

12. The hydrostatic assembly of claim 1 wherein at least one of the pump yoke and motor yoke is formed as a one-piece, monolithic structure.

13. The hydrostatic assembly of claim 1 wherein at least one of the pump yoke and motor yoke is formed from multiple pieces attached together.

14. The hydrostatic assembly of claim 13, wherein the multiple pieces intersect the fluid passages such that the passages are discontinuous.

15. The hydrostatic assembly of claim 1, wherein at least one of the pump yoke and motor yoke further includes a second arm extending from the bucket portion in a direction opposite the arm portion.

16. The hydrostatic assembly of claim 15, wherein at least one tap fluid passage extends through the second arm and bucket portion of the associated yoke and into fluid communication with the associated rotating group.

17. The hydrostatic assembly of claim 15, wherein the other of the pump yoke and motor yoke also includes a second arm extending from the bucket portion in a direction opposite the arm portion.

18. The hydrostatic assembly of claim 17, wherein at least one tap fluid passage extends through the second arm and bucket portion of the other of the pump yoke and motor yoke and into fluid communication with the associated rotating group.

19. The hydrostatic assembly of claim 1, wherein the pump and motor form a first hydrostatic module and wherein the hydrostatic assembly further comprising a second hydrostatic module including a second pump having an associated yoke and a second motor having an associated yoke, the first and second hydrostatic modules being arranged with shafts facing in a mirror image arrangement such that shafts for the pumps are fixed together and the shafts for the motors are fixed together.

20. The hydrostatic assembly of claim 19, further including means for mechanical input secured to the fixed together pump shafts and means for mechanical output from the fixed together motor shafts.

21. The hydrostatic assembly of claim 19, further comprising conduits whereby fluid pressure can be balanced between the opposing pumps and the opposing motors.

22. The hydrostatic assembly of claim 1, further comprising a housing that rotatably supports the pump and motor yokes.

23. The hydrostatic assembly of claim 22, further comprising means for independently positioning each of the yokes.

24. The hydrostatic assembly of claim 23, whereby the positioning means is mounted to the housing.

* * * * *

UNITED STATES PATENT AND TRADEMARK OFFICE
CERTIFICATE OF CORRECTION

PATENT NO. : 8,240,145 B2
APPLICATION NO. : 12/391433
DATED : August 14, 2012
INVENTOR(S) : Gerald Dyck et al.

It is certified that error appears in the above-identified patent and that said Letters Patent is hereby corrected as shown below:

On the title page, in column 1, item (73), "Assignee: Parker-Hannifin Corporation, Cleveland, OH (US)" should be changed to:

--Assignee: Parker-Hannifin Corporation, Cleveland, OH (US)
              Kinetics Drive Solutions Inc., Langley, B. C. (CA)--

Signed and Sealed this
Sixth Day of January, 2015

Michelle K. Lee
*Deputy Director of the United States Patent and Trademark Office*